United States Patent [19]

Taniguchi et al.

[11] Patent Number: 5,340,976
[45] Date of Patent: Aug. 23, 1994

[54] BANDPASS PHOTON DETECTOR FOR INVERSE PHOTOEMISSION SPECTROSCOPY

[75] Inventors: Masaki Taniguchi; Toshiaki Ohta, both of Hiroshima, Japan

[73] Assignee: Hiroshima University, Hiroshima, Japan

[21] Appl. No.: 33,327

[22] Filed: Mar. 18, 1993

[30] Foreign Application Priority Data

Mar. 26, 1992 [JP] Japan .................................. 4-068235

[51] Int. Cl.⁵ ........................ G01N 21/62; G01N 23/22
[52] U.S. Cl. ..................................... 250/207; 250/372; 250/458.1; 250/459.1
[58] Field of Search ............... 250/207, 305, 306, 372, 250/458.1, 459.1; 356/311, 317; 313/103 CM, 104, 105

[56] References Cited

U.S. PATENT DOCUMENTS

| | | |
|---|---|---|
| 3,033,984 | 5/1962 | Fisher et al. . |
| 4,330,731 | 5/1982 | Garin et al. .......................... 313/104 |
| 4,472,634 | 9/1984 | Baptist et al. ..................... 250/459.1 |
| 4,845,361 | 6/1989 | Ibach et al. ........................ 250/305 |
| 4,879,915 | 10/1989 | Prince ............................... 250/458.1 |
| 5,120,965 | 6/1992 | Suga et al. .......................... 250/372 |
| 5,202,004 | 4/1993 | Kwak et al. ......................... 250/306 |

FOREIGN PATENT DOCUMENTS

| | | |
|---|---|---|
| 0018253 | 10/1980 | European Pat. Off. . |
| 0190079 | 8/1986 | European Pat. Off. . |
| 0287414 | 10/1988 | European Pat. Off. . |
| 0475305 | 3/1992 | European Pat. Off. . |
| 1049533 | 11/1966 | United Kingdom . |

OTHER PUBLICATIONS

Review of Scientific Instruments, vol. 61, No. 9, Sep., 1990, pp. 2277–2288, P. D. Johnson et al., "Inverse Photoemission".
Patent Abstracts of Japan—JP 54 016 171, Feb. 6, 1979, (Hamamatsu).
Applied Optics, vol. 18, No. 4, Jul. 15, 1979, "Inexpensive Highly Efficient VUV Light Detectors", William H. Wing, p. 2346.
J. Phys. E. Sci. Instrum., vol. 18, 1985, "A Simple And Compact System For . . . Photoemission and Photoemission In The Vacuum Ultraviolet", N. Babbe et al., pp. 158–160, no month.
Rev. Sci. Instrum., vol. 58, No. 4, Apr. 1987, "Bandpass Photon Detector . . . Inverse Photoemission Spectroscopy", I. Schafer et al., pp. 710–711.
Nuclear Instruments and Methods In Physics Research, 1993 "Performance of the Inverse Photoemission . . . Narrow Bandwidth and High Sensitivity", Ueda et al., pp. 1–43, No month.
Rev. Sci. Instrum., vol. 64, No. 1, Jan., 1993, "Bandpass Photon Detector . . . Photoemission Spectroscopy", K. Yokoyama et al., pp. 87–90.

Primary Examiner—David C. Nelms
Assistant Examiner—Stephone B. Allen
Attorney, Agent, or Firm—Spencer, Frank & Schneider

[57] ABSTRACT

A bandpass photon detector for inverse photoemission spectroscopy comprises a sample chamber and an analyzer chamber connected to a vacuum exhaust system, respectively; a photon detector connected to the analyzer chamber; the sample chamber and the analyzer chamber are switchably connected through a gate valve and provided with a sample transfer system for transferring a sample held at a center axial line of the sample chamber to a center portion of the analyzer chamber, the analyzer chamber is provided with an electron gun opposed to a sample positioned at a center where the sample is transferred and a photomultiplier comprising a low cut filter consisting of Cu-BeO at the opposite side of the electron gun, wherein a potassium chloride is deposited in a thickness of 500–1000 Å on a first diode of said photomultiplier, thereby high inverse photoemission spectroscopy can be measured so as to analysis and estimation of semiconductors and magnetic material.

3 Claims, 11 Drawing Sheets

FIG_1A

FIG_1B

FIG_2A

FIG_2B

FIG_12A

FIG_12B

FIG_13A

FIG_13B

BANDPASS PHOTON DETECTOR FOR INVERSE PHOTOEMISSION SPECTROSCOPY

BACKGROUND OF THE INVENTION

Field of the Invention

The present invention relates to an improvement of a bandpass photon detector for inverse photoemission spectroscopy made by combining a low cut filter and a high cut filter, and aims to decrease a fall width at half maximum (FWHM) of the bandpass photon detector for inverse photoemission spectroscopy of the present invention from 0.70 eV at present to about 0.3 eV. In order to cover such defect that if a bandpass width of the photon detector is narrowed, sensitivity is inevitably lowered, it is necessary to improve sensitivity of a photomultiplier consisting of Cu-BeO used as a low cut filter, so that the present invention aims to deposit by vapor deposition potassium chloride (KCl) in a thickness of 500–1000 Å on the first diode of the photomultiplier, so as to improve resolution and detecting sensitivity of a bandpass photon detector, to make high resolution inverse photoemission spectroscopy measurement possible, and to greatly contribute to analysis and evaluation of semiconductors and magnetic materials.

RELATED ART STATEMENT

Information of the occupied states in material can be obtained by photoemission spectroscopy. The photoemission spectroscopy has developed together with the development of synchrotron radiation, and there is a method of measurement with the use of a line spectrum light source in experiment at the laboratory level, so that it has already been established as an independent method of measurement and can obtain information under various occupied electronic states. Contrary to the above, the information under the unoccupied state is poor at present. However, with recent development of inverse photoemission spectroscopy which is possible to directly examine the unoccupied electronic state, information under the unoccupied electronic state can be obtained little by little.

Here, an inverse photoemission spectroscopy is to observe a photon emitted when an electron incident into the unoccupied electron state of a crystal further transits to the lower unoccupied electronic state, and if light intensity of specified energy of a vacuum ultraviolet region emitted as a function of incident electron energy is monitored, an electronic structure in the unoccupied state, such as density of states can be obtained. However, a number of emitted photons is about $10^{-8}$ with respect to incident electrons having 1 eV in width, and the number is very few as compared with electron yield of spectroscopy in relation corresponding thereto. Therefore, the development of an electron source of high luminance and large current and the development of highly sensitive photon detector are the key for the development of inverse photoemission spectroscopy, and its experiment has been conducted at present.

The prior bandpass photon detector for inverse photoemission spectroscopy is composed of a simple combination of a low cut filter and a high cut filter, as the low cut filter is employed a photomultiplier having Cu-BeO in the first diode, and as the high cut filter is employed a window made of $SrF_2$, and there are obtained properties of center energy of 9.40 eV and a FWHM of 0.70 eV. This bandpass photon detector is characterized in simple structure and highly stable operation, but the resolution obtained was limited to 0.7 eV at most.

Photoemission spectroscopy and inverse photoemission spectroscopy are means for directly observing the occupied and the unoccupied electronic states in respective materials and have mutually complementary character. Standard resolution of photoemission spectroscopy at present is about 0.3 eV. It is extremely desirable for studying material to align the inverse photoemission spectrum and the photoemission spectrum on the same energy axis and to examine the occupied and the unoccupied electronic states with precision of the same degree. In order to materialize this object, the bandpass width of a bandpass photon detector should be narrowed to about 0.3 eV, but could not yet be solved.

SUMMARY OF THE INVENTION

Characteristics of a bandpass photon detector for inverse photoemission spectroscopy according to the present invention are as follows.

An object of the present invention is to provide a bandpass photon detector for inverse photoemission spectroscopy comprising means for condensing light emitted when a beam from an electron gun is incident into a sample by a mirror and making the condensed light incident in a low cut filter type photomultiplier having a high cut filter window, wherein potassium chloride is deposited in a thickness of 500–1000 Å on the first diode of said photomultiplier.

Another object of the present invention is to provide a bandpass photon detector for inverse photoemission spectroscopy comprising a sample chamber and an analyzer chamber connected to a vacuum exhaust system, respectively, and a photon detector connected to said analyzer chamber, said sample chamber and analyzer chamber being switchably connected through a gate valve and provided with a sample transfer system for transferring a sample held at a center axial line of the sample chamber to a center portion of the analyzer chamber, said analyzer chamber being provided with an electron gun opposed to a sample positioned at a center where the sample is transferred and a photomultiplier comprising a low cut filter consisting of Cu-BeO at the opposite side of the electron gun; wherein improvement comprising: a potassium chloride deposited in a thickness of 500–1000 Å on a first diode of said photomultiplier.

Further object of the invention is to provide a bandpass photon detector for inverse photoemission spectroscopy comprising: a photomultiplier having a high cut filter and a low cut filter for detecting specified energy from emitted light from the sample based on a beam incident into a sample from an electron gun and emergent from the sample; a photon counter circuit having a pulse counter and a computer; a voltage control circuit of said electron gun; an electron lens voltage control circuit of said electron gun consisting of a GPIB program, whereby the control system is controlled by a computer with a GPIB programmer.

BRIEF DESCRIPTION OF THE DRAWINGS

For a better understanding of the invention, reference is made to accompanying drawing, in which.

1 is an analyzer chamber, 2 is a sample chamber, 3 is a valve, 4A is a filing device for filing sample, 4B is a sample deposition device, 5 is a sample cleavage device, 6 is an electron beam, 7 is a sample holder, 8 is a sample bunk, 9 are bellows, 10 is a sample transferring rod, 11 is a sample transfer apparatus, 12 is an electron gun, 13 is a concave mirror, 14 is a sample, 15 is a manipulator for manipulating sample position, 16 is a photon detector, 17 is a rotary pump (RP), 18 is a turbo molecular pump (TMP), 19 is a titanium sublimation vacuum pump, 20 is an ion vacuum pump, 21 and 22 are valves, 23 and 24 are leak valves, 25 is an instrumentation and control device, 26 is a photomultiplier, 27 is a preamplifier, 28 is a linear amplifier, 29 is a pulse height analyzer, 30 is a pulse counter, 31 is a computer, 32 is a GPIB programmer, 33 is a digital electrometer, 34 is a D-C power source, 35 is a Cu mesh, 36 is a photon beam, 37 is a crystal (SrF$_2$) window material, 38 is a Cu-BeO photomultiplier, 39 is a light shield, 40 is a vacuum deposition device, 41 is a film thickness meter, 42 is a deposition source, 43, 44 and 45 are valves, 46 is a monochromator, 47 is a storage ring, 47A and 47B are valves, 48 is a mirror, 49 is a monochromator and 50 is a vacuum chamber for photon detector efficiency test.

DESCRIPTION OF THE PREFERRED EMBODIMENT

A principle of inverse photoemission spectroscopy aimed by the present invention is as follows.

(1) Principle of Inverse Photoemission Spectroscopy

As a method or finding the electronic states of a material, a photoemission spectroscopy has been well known. This method is to measure kinetic energy and momentum, spin of electron emitted to light incident from the outside, and is essentially suitable for examining the occupied electronic states. Contrary to the above, in order to examine the unoccupied electronic states, use has been made of an excitation method by means of light and electron beam, but in this case, a joint density of the occupied electronic states with the unoccupied electronic states is reflected, or a coulomb interaction between electron and hole is strongly reflected, and as a result, it was difficult to obtain the information of the unoccupied electronic states alone. Therefore, there has recently been appeared an inverse photoemission spectroscopy for searching the unoccupied electronic states. It has been utilized as effective means.

(2) BIS Mode and TPE Mode

An inverse photoemission spectroscopy is classified into two experimental modes according to a photon detecting method. That is, BIS (Bremsstrahlung Isochromat Spectroscopy) mode for detecting only light of some specified energy and TPE (Turnable Photon Energy) mode for measuring an energy distribution of emitted light. Apparatus constituent elements are different according to difference of experimental mode, but an apparatus of the TPE mode is possible to measure the BIS mode.

The present invention relates to a photon detector with the aid of a photon detecting method by inverse photoemission spectrometry of the BIS mode.

Figure 1A:
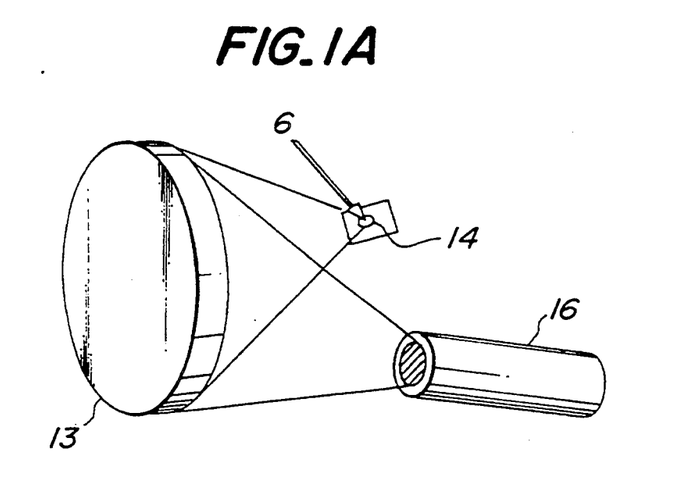
FIG. 1(A) is a schematic diagram of a bandpass photon detector according to the present invention.
Figure 1B:
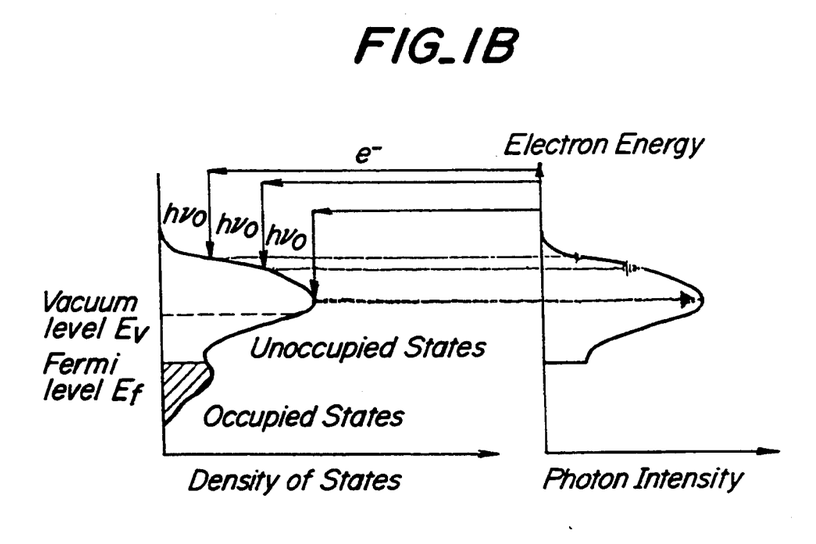
FIG. 1(B) is a BIS mode view showing emission intensity corresponding to unoccupied density of states obtained by scanning energy of incident electron beam.

As shown in FIG. 1, in a BIS mode, only the light of some specified energy is detected from the light emitted when an electron beam is incident into a sample. When the energy of the incident electron is changed, the intensity of detected light is increased at the time when the energy difference between the initial state and the final state becomes equal to the energy of detected light. Therefore, if the intensity of emitted light of some specified energy is plotted as a function of electron energy as scanning the energy of the incident electron beam, the intensity reflects the unoccupied density of states. As merits of the BIS mode, 1) optical system is bright and 2) the BIS mode is cheap. The BIS mode is designed to be directly assembled in a detector without using any spectroscopic element, so that its optical system is very bright. Moreover, the detector employs a usual pulse counting system, so that the detector is comparatively cheap. However, in addition to detect light of single energy only, the energy of the detected light cannot optionally be determined, so that a flexibility of measurement is inevitably low. General constituent elements of the BIS measuring device are an electron gun, a beam-condensing mirror and a bandpass filter type photon detector.

Figure 2A:
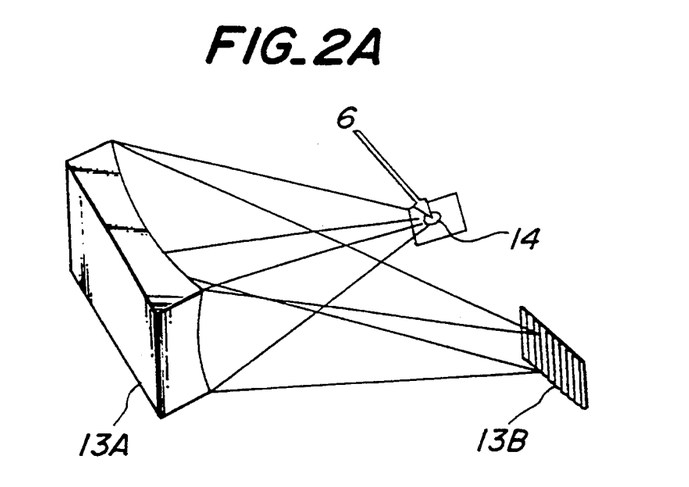
FIG. 2(A) is a schematic diagram of a multichannel photon detector of a TPE mode.
Figure 2B:
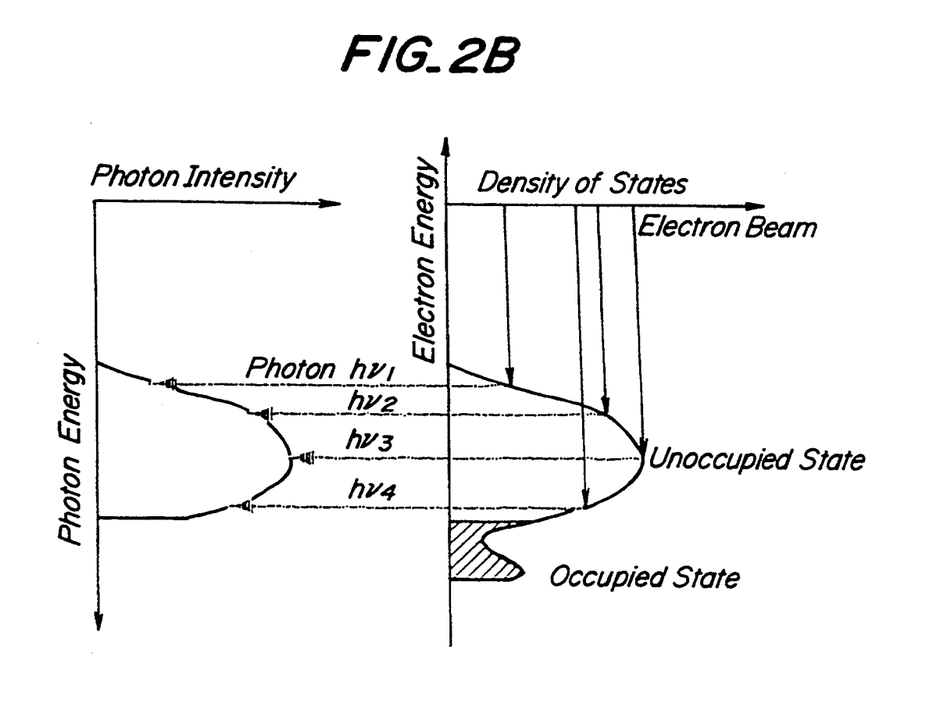
FIG. 2(B) is a TPE mode view showing photoelectron intensity and electron beam state intensity corresponding to all photon energy detected in the TPE mode.

As shown in FIG. 2, the TPE mode detects the emitted light when a low speed electron beam of constant energy is incident into a sample and measures its energy distribution. Constituent elements of the TPE mode device are an electron gun, a spectroscopic element and a two-dimensional detector. Since the energy of the initial state is constant, the energy distribution of emitted light reflects the state density of the final state as it is. Thus, the light of various energies emitted from a sample is detected at the same time, so that the efficiency of measurement is extremely good. It is further possible to measure a bandpass structure in the perpendicular direction against the surface and the depth dependence of the unoccupied electronic states by scanning the incident electron energy and to measure a resonant inverse photoemission spectrometer by optionally selecting the detected light energy. However, the device becomes very expensive with the use of a spectroscopic element and a two-dimensional detector. Furthermore, since the efficiency of spectroscope in an inverse photoemission process is very low, and then its optical system is very dark, thereby an electron source of high luminance becomes necessary. However, if a current is increased too high, the surface of sample is broken occasionally, and the measurement becomes difficult.

(3) Construction of Inverse Photoemission Spectrometer

An inverse photoemission spectrometer consisting of the bandpass photon detector roughly comprises a sample chamber 1 and an analyzer chamber 2.

A sample preparation chamber comprises a filing device 4A for filing the surface of sample, a vapor deposition apparatus 4B for vapor depositing a sample to a substrate, a cleavage system 5 for cleaving a sample, a sample bunk 8 for housing a sample holder 7 for measuring plurality of samples without breaking vacuum.

Figure 3A:
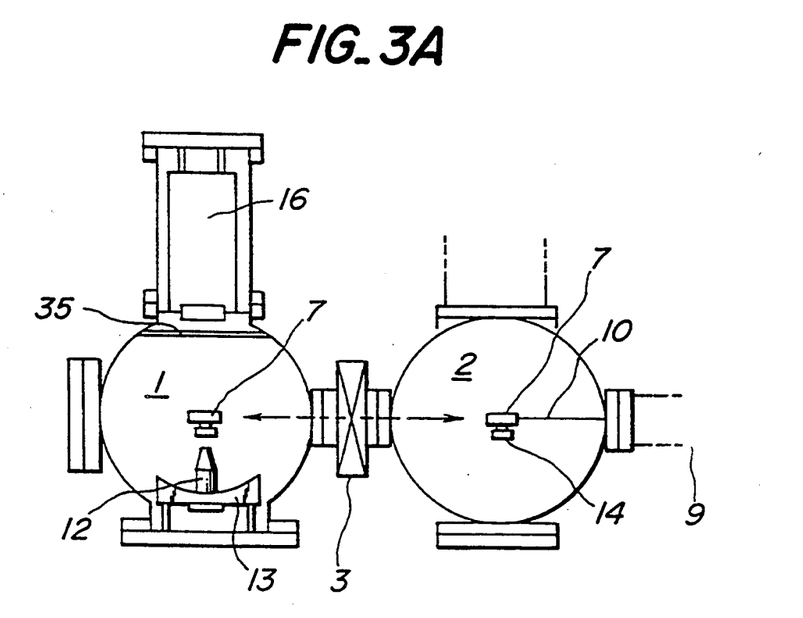
FIG. 3(A) is a cross-sectional view of a vacuum system of an inverse photoemission spectroscopy according to the present invention.
Figure 3B:
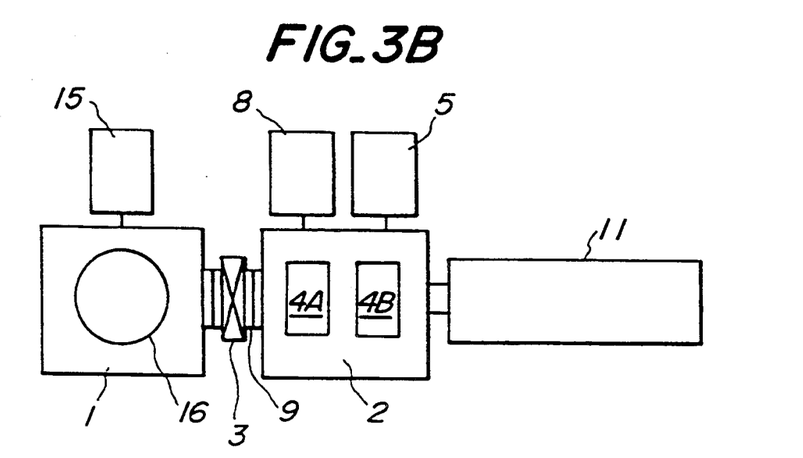
FIG. 3(B) is a side view of FIG. 3(A)

In order to transfer a sample from a sample chamber 1 to an analyzer chamber 2 through gate valve 3, use was made of a sample transfer system 11 including a sample transferring rod 10 for delivering a sample holder 7 into a welding bellow 9 as shown in FIG. 3.

Figure 4:
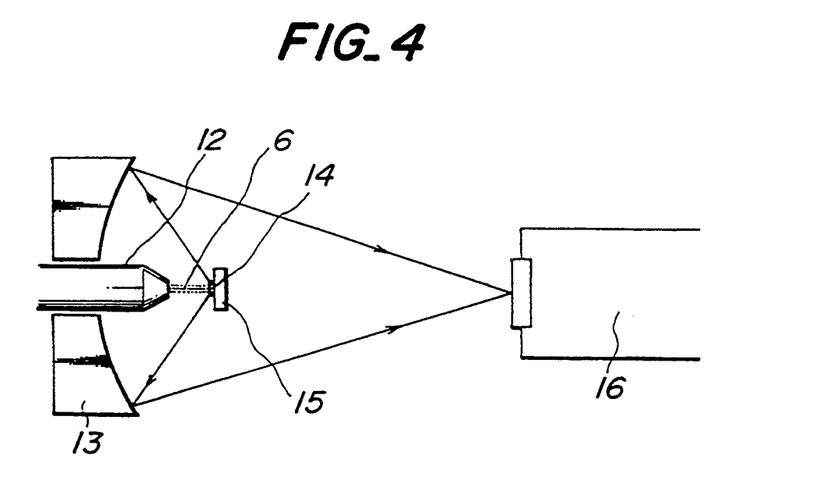
FIG. 4 shows a schematic view of arrangement of a BIS portion of the inverse photon detector according to the present invention.

The analyzer chamber 2 comprises an electron gun 12 for controlling convergence of kinetic energy of an incident electron and an electron beam, a concave mirror 13 for condensensing emitted light, a manipulator 15 for manipulating the position of a sample 14 and a photon detector 16 for detecting emitted light as shown in FIGS. 3 and 4.

Figure 5:
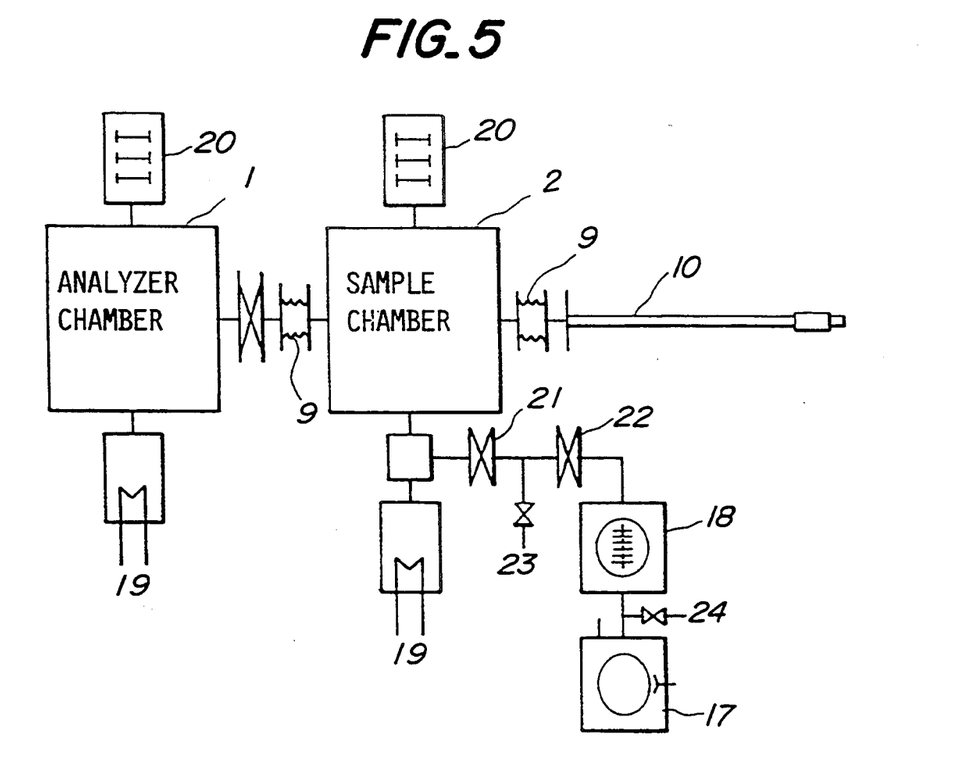
FIG. 5 shows a block diagram of an exhaust system of the inverse photon detector according to the present invention.

Air was roughly suctioned from the sample chamber 1 by a rotary vacuum pump 17 and a turbo molecular pump 18 to make the inside in vacuo, and the whole device was baked in vacuo of $10^{-6}$ Torr. A degree of vacuum reached the same degree before baking, the baking was completed, and it was exhausted to ultrahigh vacuum of $10^{-10}$ Torr by titanium sublimation pump 19 and an ion pump 20 attached to the sample chamber 1 and the analyzer chamber 2, respectively. In this case, valves 21, 22 and 23 of roughing vacuum suction system were closed as shown in FIG. 5.

Standard degrees of vacuum are $4 \times 10^{-1}$ Torr in the analyzer chamber 2 and $6 \times 10^{-10}$ Torr in the sample chamber 1. These degrees of vacuum were measured by fitting an ion gauge made by ANELVA to the analyzer chamber 2 and the sample chamber 1, respectively.

Figure 6:
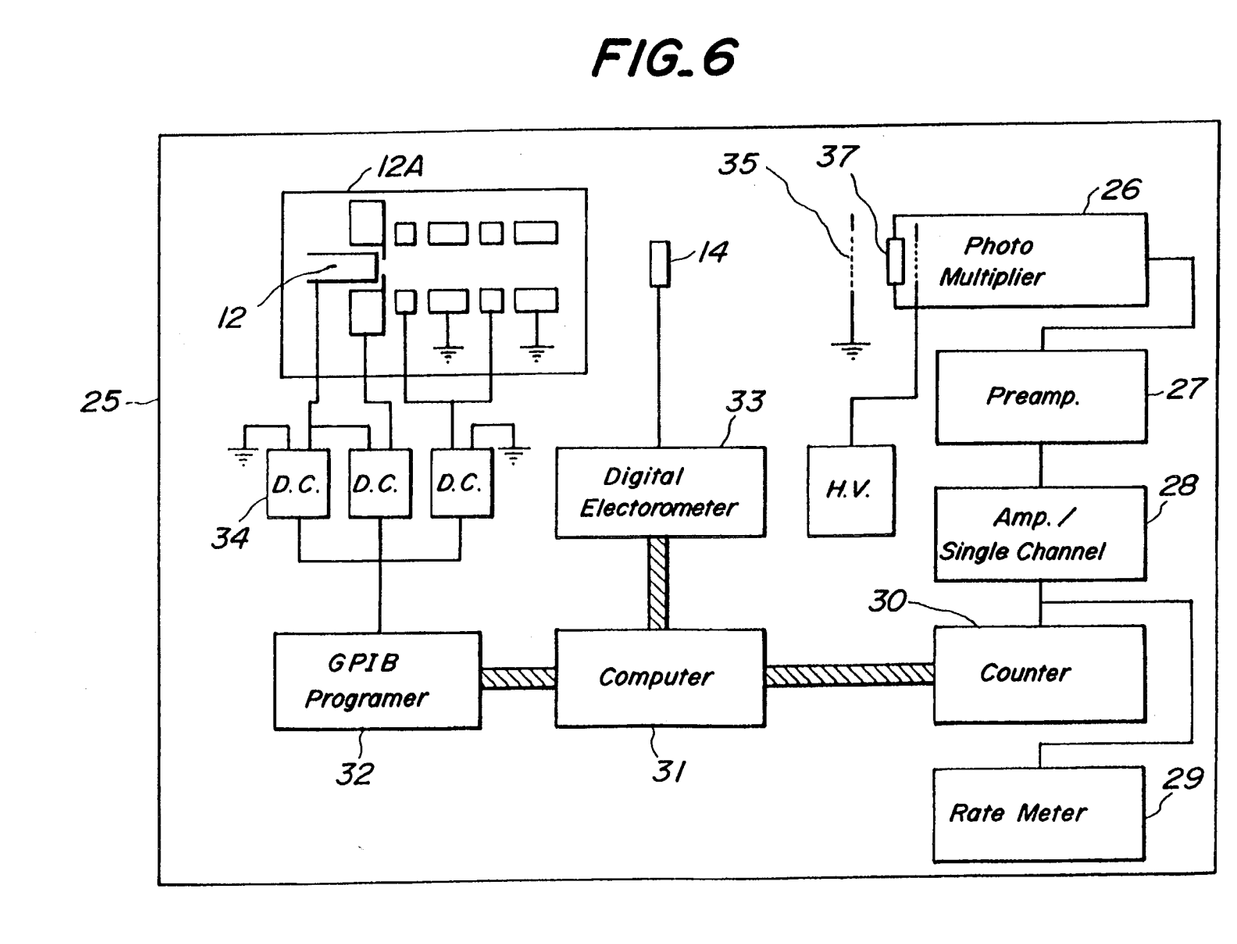
FIG. 6 shows a block diagram of a measurement and control system of the inverse photon detector according to the present invention.

FIG. 6 shows a block diagram of a measuring device of an inverse photoemission spectrometer according to the present invention. The device of the present invention is an experimental device of the BIS mode, in which the energy of incident electron beam can be scanned by controlling an accelerating voltage of the electron gun 12 and detects the emitted photons by a bandpass photon detector 16. Then, a signal emitted as a pulse current from a photon detector 26 is amplified by a preamplifier 27 and a linear amplifier 28, and counts a pulse signal of photon at a pulse counter 30 as monitoring the signal at a pulse height analyzer 29. These devices are controlled and stored signals at a computer 31 through a GPIB programmer 32 and record photon pulse signals as a function of electron beam energy in a floppy disk. Moreover, in order to standardize a photon pulse signal, an electron beam from the electron gun 12 is incident into a sample 14 so as to simultaneously detect a current flowed into the sample 14 as an incident electron beam signal, to convert it into a digital signal through a digital electrometer 33 and to simultaneously record in a computer 31. Reference numeral 34 is an electric source for scanning electron beam energy.

Efficiency Improvement Test of Photon Detector

(1) Photon Detector

Figure 7:
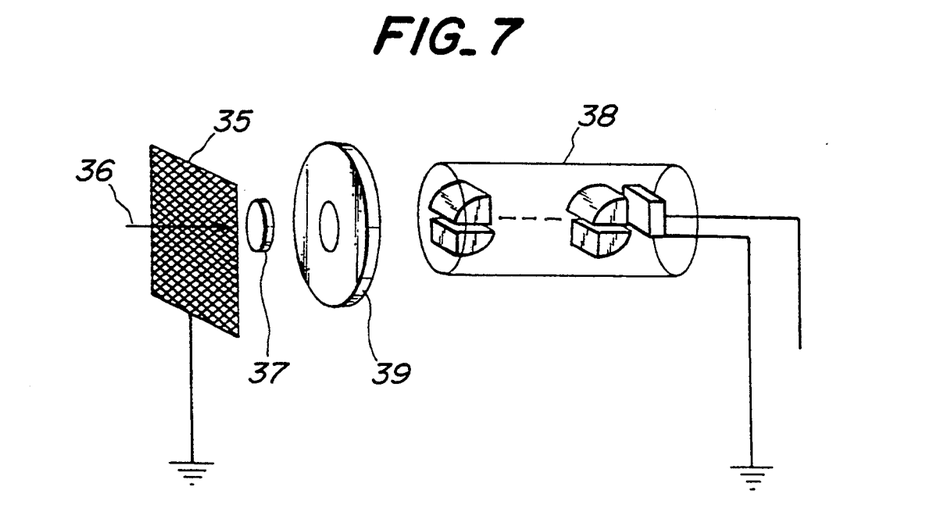
FIG. 7 shows a schematic diagram of the photon detector according to the present invention.
Figure 8:
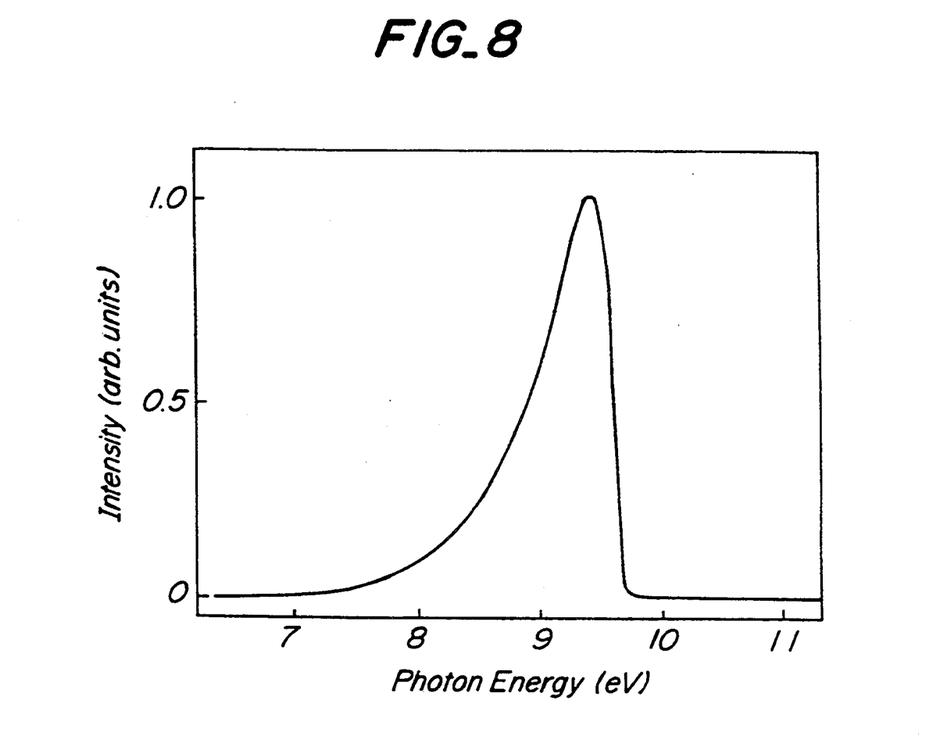
FIG. 8 shows a bandpass diagram of a photon detector before improvement by the present invention.

A bandpass photon detector as shown in FIG. 7 comprises a window material for interrupting light on the high energy side and a detector for interrupting light on the low energy side. At first, as a type using a solid photoelectric element used in the present invention, a Cu-BeO photomultiplier 38 is used for interrupting light on the low energy side, and the bandpass properties can be changed by changing a window material 37. For a study of the present invention, there was developed and used a bandpass filter type photon detector in combination of a crystal ($SrF_2$) window material 37 and a Cu-BeO photomultiplier 38. The structure thereof is shown in FIG. 7.

A photon detector of this type has the possibility of improving sensitivity about three times when alkaline halide such as potassium bromide (KBr) is deposited on the first dynode, and it has merits such as easy handling, high stability and the like. An inverse photoemission spectroscope in use applies a negative high potential voltage to a first diode of a photomultiplier so as to prevent an electron directly entering from an electron gun to the photomultiplier. Moreover, in order to prevent an electric field from the photomultiplier from leaking into the electron gun and the region where a sample is placed, the front thereof is shielded with a copper mesh having 90% transmission. A property of the bandpass is determined by rising portion of sensitivity of the Cu-BeO photomultiplier of a low cut filter and a cut-off portion of absorbing end of a high cut filter made of $SrF_2$. As performance of the photon detector by this combination, the maximum value of a peak is 9.4 eV and the FWHM is 0.69 eV.

All resolution of inverse photoemission spectroscopy is determined by a geometrical average of the energy width of electron beam and the resolution of the photon detector. In the prior inverse photoemission spectroscopy, the energy width of electron beam and the resolution of photon detector are 0.25 eV and 0.69 eV, respectively, and the whole resolution is as follows.

$$\sqrt{(0.25)^2 + (0.69)^2} \simeq 0.7 \text{(eV)}$$

A study of the present invention was conducted by aiming at an access of performance of photon detector to that of photoemission spectroscopy by improving performance of a photon detector for inverse photoemission spectroscopy for dominantly determining 0.69 eV and resolution of the device from both aspects of resolution and sensitivity.

First, with the aid of ultraviolet absorption peaks of RbCl and KBr as 8.9 eV and 8.6 eV, respectively, the film thickness of these crystals on an $SrF_2$ window are changed during deposition, the rising sensitivity of the photomultiplier of a Cu-BeO low cut filter on the low energy side is cut, and an experiment for narrowing half value width was conducted. At the same time when the FWHM is narrowed, the light transmission amount is reduced as much as the amount of depositing ion crystal, thereby the intensity of the detector is reduced. In order to solve this reduction amount, KCl was deposited on the first diode of the Cu-BeO photomultiplier, and the reduction amount of intensity was solved by utilizing quantum efficiency of KCl. Whereby, the sensitivity of the detector is improved.

(2) Test Device

(2)-1 Vacuum Vapor Deposition Device

Figure 9:
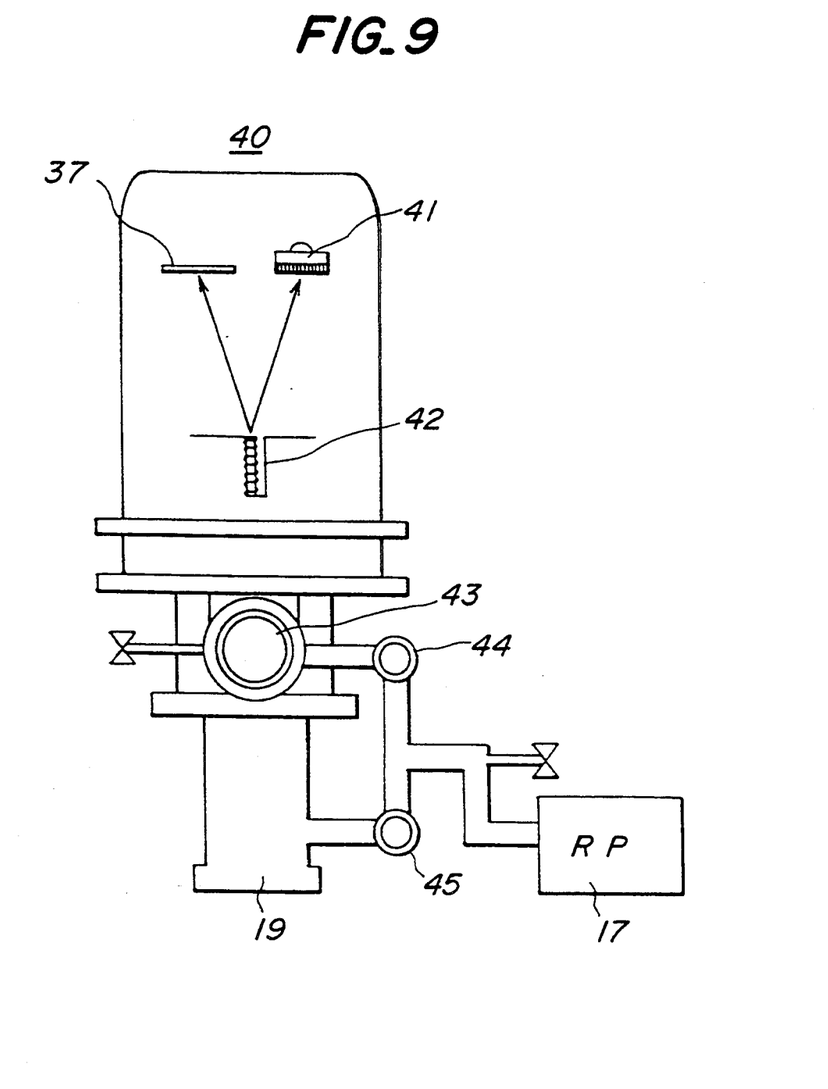
FIG. 9 shows a diagram of a vacuum deposition device used in the present invention.

FIG. 9 shows an outline of the vacuum vapor deposition device used in the study of the present invention. Suction of the vapor deposition device is carried out at a rotary vacuum pump and a diffusion vacuum pump (oil diffusion pump). Vacuum can be obtained up to $1-3 \times 10^{-5}$ Torr by sucking from the start to 30–40 minutes thereafter, and deposition can be started. In a deposition port, a deposition source having length of winding of 45 cm and a diameter of 0.6 mm$\phi$ Ta wire around a quartz tube of 3 mm$\phi$ in inner diameter and 2.1 cm in length is set, and at the portion of 10.8 cm from the upper end of the quartz tube and $SrF_2$ window or a first diode of a Cu-BeO low cut filter are set on one hand and a head of film thickness meter is set on the other hand to be at symmetrical positions viewed from the deposition source. A film thickness meter is made by ANELVA, in which a film thickness head used is a crystal vibrator of quartz, and the relation between a film thickness (t:Å) of a deposited material and reduction ($\Delta f$:Hz) of an inherent frequency of the crystal vibrator of quartz, assuming that density of the deposited material is d, as follows.

$\Delta f = -0.62 \cdot d \cdot t$

Hence, when the density of the deposited material is known, the film thickness can be controlled.

There are respective two set of $SrF_2$ high cut filter windows and that of Cu-BeO low cut filters, one of which is set in the vacuum device, while the other is set on the beam line of photon detector and measured, so that test efficiency is improved. Once deposited $SrF_2$ high cut filter window and Cu-BeO low cut filter were washed with hot water for washing ion crystals deposited on the surface of said window with the aid of high solubility of ionic crystal to water, and further washed with ethyl alcohol for cleaning the surface thereof. The $SrF_2$ high cut filter and Cu-BeO low cut filter after cleaning were again set in the vapor deposition device and ion crystal was deposited thereon.

(2)-2 Efficiency Estimation of Bandpass Photon Detector

Figure 10:
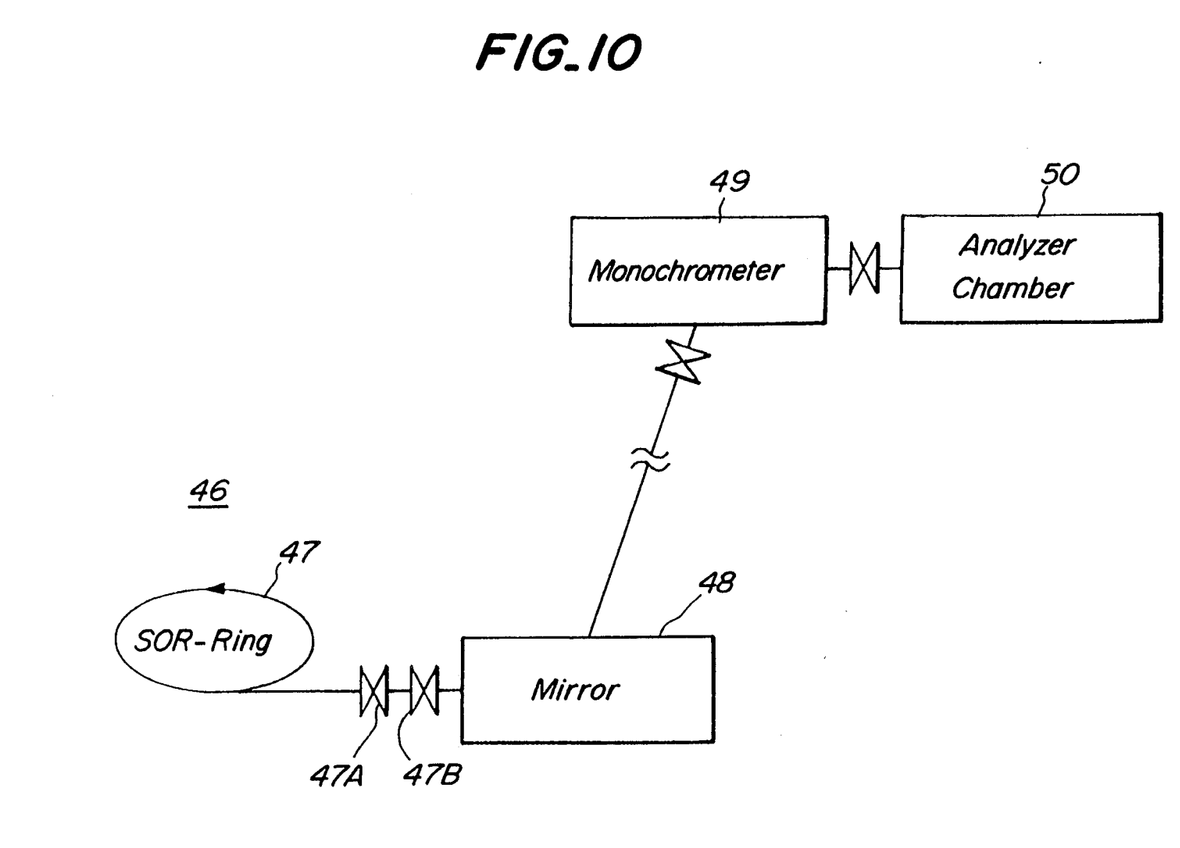
FIG. 10 shows a diagram of a test device used for efficiency estimation of a bandpass photon detector of the present invention.

FIG. 10 shows a block diagram of a measurement system used for an efficiency estimation test of the photon detector according to the present invention. The same condition as that of the inverse photoemission process of inverse photoemission spectroscopy is set, and there is taken a special form of applying monochromatic light from a spectroscope to a photon detector as it is and assembling a signal of the photon detector, so that a vacuum chamber is only provided with an analyzer chamber including a photon detector, and the exhaust is carried out by a rotary pump, a turbo molecular pump and an ion pump. Leak is carried out by every one measurement, the photon detector is only removed, and vacuum can be formed by exchanging the ion crystal deposited $SrF_2$ window and the first diode of Cu-BeO photomultiplier. Vacuum becomes $3 \times 10^{-6}$ Torr by vacuum suction for about 90 minutes without baking, and measurement can be ready.

Resolution of the photon detector is determined by the rise on the low energy side by the Cu-BeO first diode and the ion crystal KCl deposited on the first diode and light cut ability on the high energy side by the $SrF_2$ window and the ion crystal deposited on the $SrF_2$ window. Therefore, in order to increase resolution of the photon detector, it is desirable to cut the rise (particularly the gently sloped portion) on the low energy side and to shift the cut of light on the high energy side to the low energy side. Moreover, high sensitivity can be materialized by increasing quantum efficiency of the first diode.

(2)-3 Bandpass Property in Case of Depositing KBr on $SrF_2$ Window

Figure 11A:
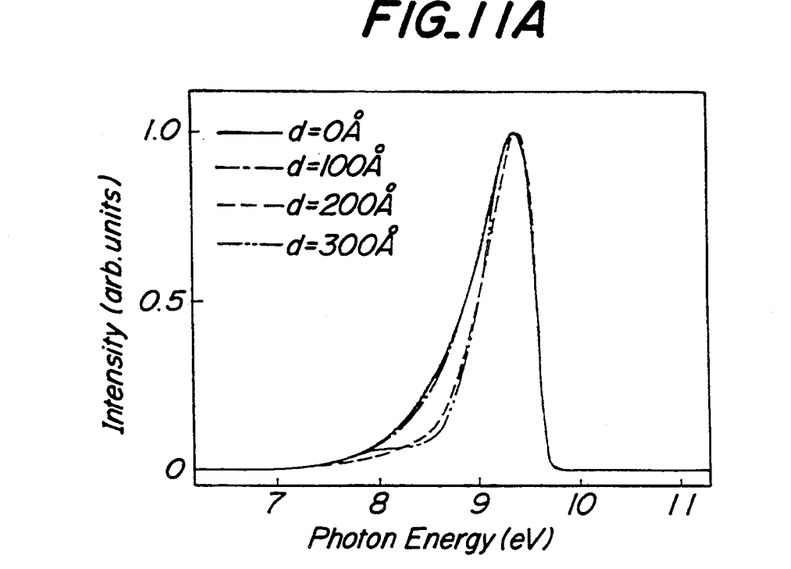
FIG. 11(A) is a graph of bandpass properties showing the relation between photon energy and intensity showing the improved state of bandpass width by aligning detected sensitivities in case of depositing KBr on a SrF$_2$ window as a comparative example.
Figure 11B:
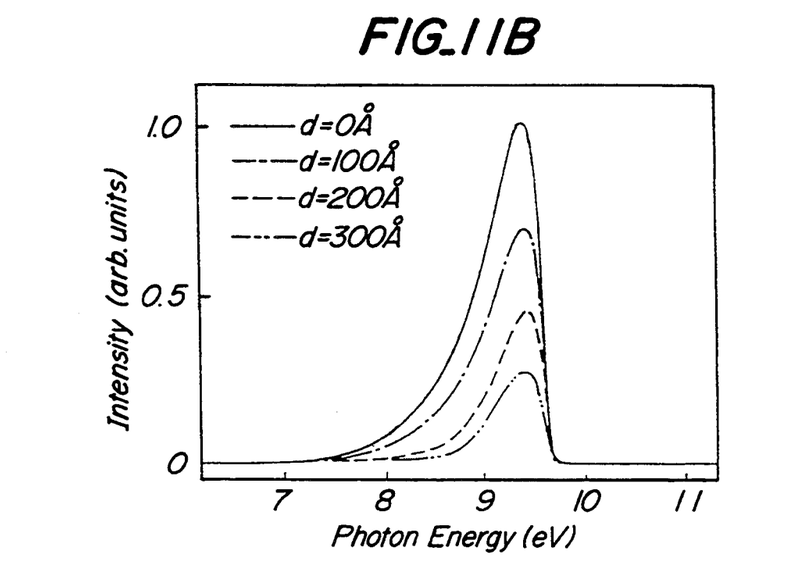
FIG. 11(B) is a graph of bandpass properties comparing detected intensities to a film thickness in case of depositing KBr on a SrF$_2$ window as a comparative example.

FIGS. 11-A, 11-B and Table 1 show properties of the photon detector in case of depositing KBr on a $SrF_2$ window. FIG. 11-A shows the change of a bandpass width in case of aligning the maximum value of signal wavelength from the detector. It is understood from FIG. 11-A that as a film thickness of deposited KBr increases to 100 Å, 200 Å and 300 Å, its bandpass width improves to 0.68 eV, 0.59 eV and 0.57 eV. This is because the peak position of valence band exciton absorption of KBr is 8.6 eV, so that property of the bottom on the low energy side which was a cause for widening the FWHM of the photon detector can be cut.

TABLE 1

Change of Peak Intensity, Sensitivity and FWHM to Thickness of KBr, RbCl deposited on $SrF_2$ window (Comparative Example)

| | Thickness of protective film (Å) | FWHM (eV) | Peak intensity | Sensitivity |
|---|---|---|---|---|
| KBr | 0 | 0.69 | 1.00 | 1.00 |
| | 100 | 0.68 | 0.69 | 0.68 |
| | 200 | 0.59 | 0.46 | 0.39 |
| | 300 | 0.57 | 0.28 | 0.23 |
| RbCl | 0 | 0.69 | 1.00 | 1.00 |
| | 100 | 0.59 | 0.81 | 0.73 |
| | 150 | 0.52 | 0.66 | 0.56 |
| | 200 | 0.50 | 0.58 | 0.47 |

FIG. 11-B shows the change of signal intensity by the change of a KBr film thickness, but peak intensity of a signal when the film thickness is 300 Å reduce 0.28 times as compared with the case when ionic crystal is not deposited on the photon detector, and intensity (i.e. area intensity) reduces 0.23 times. It is understood from the above that in case of depositing KBr on the SrF$_2$ window, an amount of transmission light reduced as increase of the film thickness so that the bandpass width is increased by sacrificing intensity and sensitivity.

(2)—4 Bandpass Property in Case of Depositing RbCl on SrF$_2$ Window

Figure 12A:
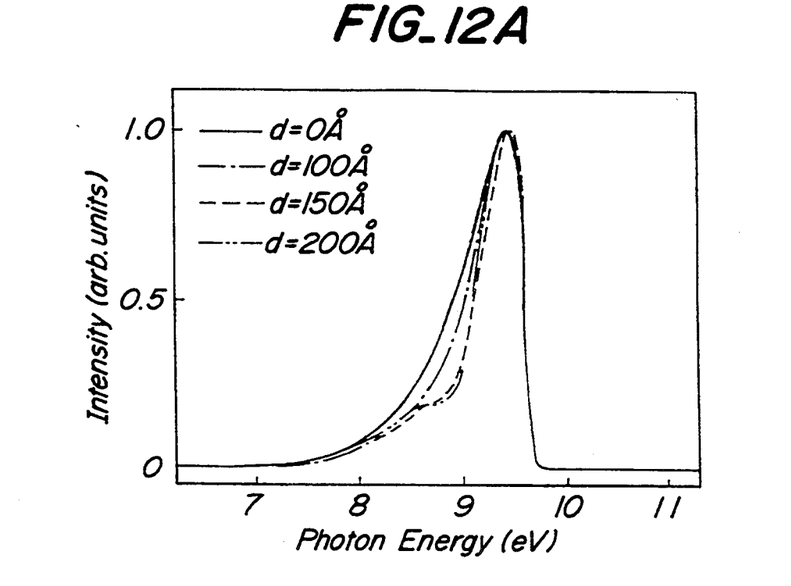
FIG. 12(A) is a graph of bandpass properties showing the change of bandpass width accompanied to the increase of a film thickness by making detected intensity constant in case of depositing RbCl on a SrF$_2$ window as a comparative example.
Figure 12B:
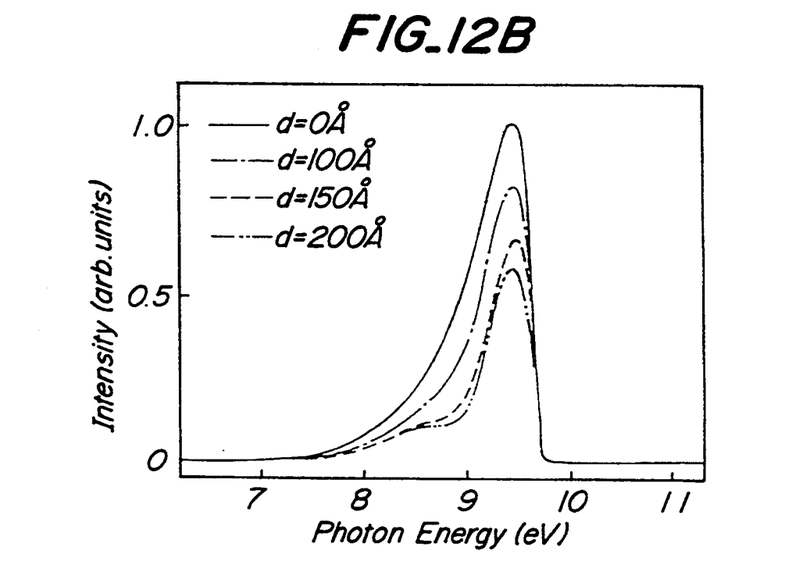
FIG. 12(B) is a graph showing the change of intensities to photon energy in case of depositing RbCl on an SrF$_2$ window as a comparative example.

FIG. 12 shows the property of the photon detector in case of depositing RbCl on the SrF$_2$ window in the order of (A) the change of bandpass width in case of aligning peak intensity and (B) the change of peak intensity by difference of film thickness. Table 2 shows the result of numerical values. It is understood from this test that as the film thickness of RbCl is increased to 100 Å, 150 Å and 200 Å, the bandpass width of the photon detector is improved to 0.59 eV, 0.52 eV and 0.58 eV, respectively, in the same manner as in the test of KBr. This occurs by valence band absorption of the chlorine ion to conduction band, and it is also understood that the peak of valence band exciton absorption of RbCl is 8.93 eV which is more close to the peak position of the bandpass property of the photon detector than KBr, so that the rising portion by Cu-BeO on the low energy side is well cut off.

Intensity of signal wavelength when the film thickness is 200 Å reduced 0.58 times as compared with the case of depositing no ion crystal on the photon detector, and intensity reduced 0.47 times. It is understood from the above that the case of depositing RbCl on the SrF$_2$ window in the same manner as in KBr improves bandpass width with increase of the film thickness by sacrificing intensity and sensitivity.

(2)—5 Bandpass Property in Case of Depositing KCl on Cu-BeO Photomultiplier

Figure 13A:
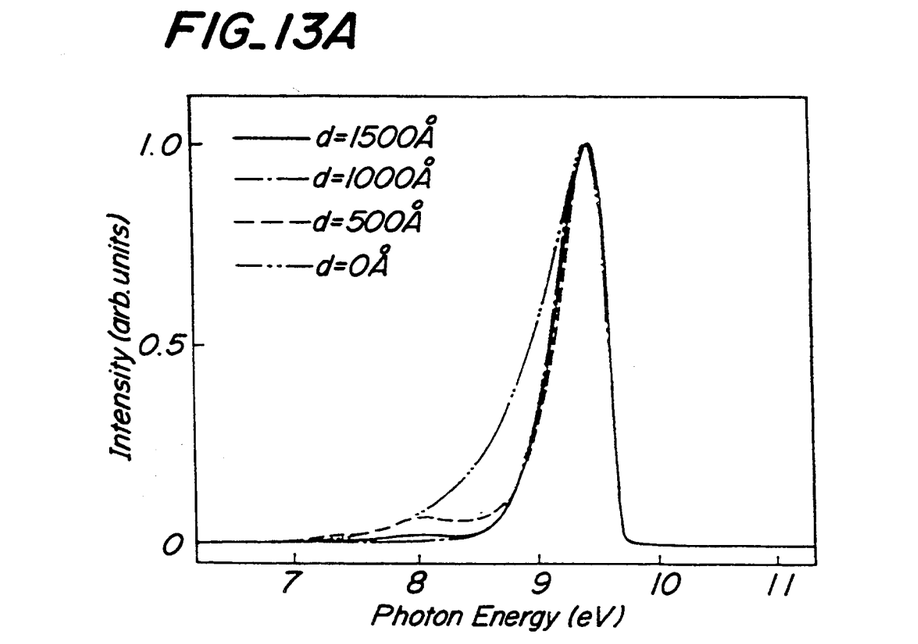
FIG. 13(A) is a graph showing the change of bandpass width in case of depositing KCl on a first diode of a Cu-BeO photomultiplier of the present invention.
Figure 13B:
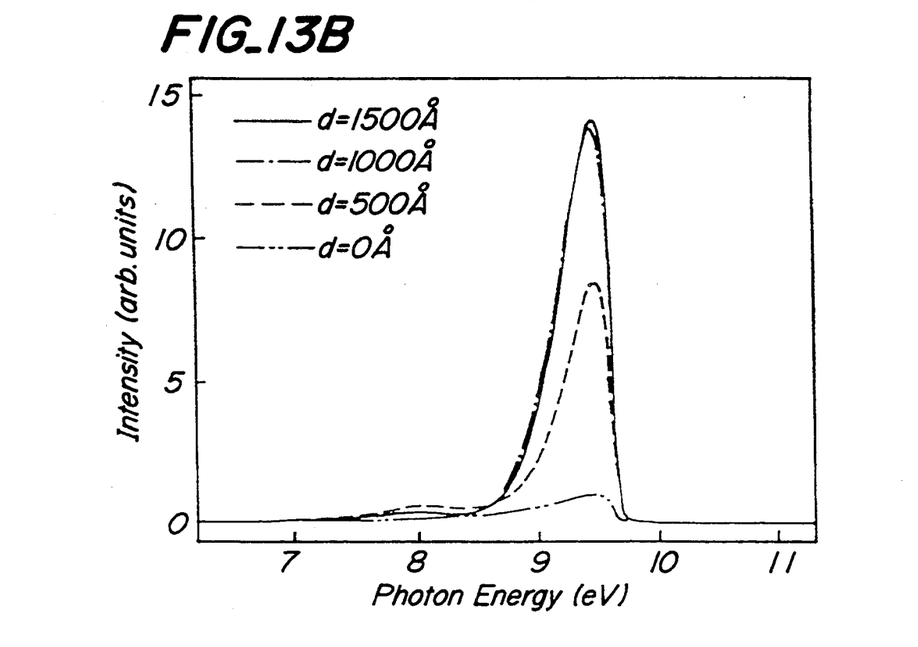
FIG. 13(B) is a graph showing the change of sensitivity in case of depositing KCl on a first diode of a Cu-BeO photomultiplier of the present invention.

FIG. 15-A shows the property of the photon detector in case of depositing KCl on the first diode of Cu-BeO photomultiplier first diode. FIG. 13-A shows the change of FWHM in case of aligning the maximum value of signal wavelength from the detector, and FIG. 13-B shows the change of signal intensity by change of film thickness of KCl. Moreover, Table 2 shows their results as numerical values. It is understood from the result that the case of depositing KCl in thickness of 1000 Å improves the bandpass width to 0.47 eV, and sensitivity is improved about 1 digit as compared with the case of depositing no KCl.

TABLE 2

Change of Peak Intensity, Sensitivity and FWHM to thickness of KCl deposited on first diode of Cu-BeO of photomultiplier of the present invention

| Thickness of protective film (Å) | FWHM (eV) | Peak intensity | Sensitivity |
|---|---|---|---|
| 0 | 0.69 | 1.0 | 1.0 |
| 500 | 0.45 | 8.4 | 6.2 |
| 1000 | 0.47 | 13.7 | 9.0 |
| 1500 | 0.47 | 14.0 | 9.3 |

Here, the increase of sensitivity is considered because a vigorous photoemission is at the vacuum level or in the vicinity of the vacuum level.

As shown in FIGS. 13-A and 13-B, it is understood that the bandpass properties of the photon detector in case of depositing KCl in thickness of 1000 Å and 1500 Å are very alike. In bandpass properties in case of depositing in thickness of 1500 Å, since the broad peak in the vicinity of 8 eV is large, it is deviated from the view point of detecting only light from the maximum value of 9.4 eV to ±0.24 eV of signal intensity, and it was decided that the photon detector deposited KCl of thickness of 1000 Å has the most excellent property.

Improvement of the bandpass width is considered because the rise of the first diode of the KCl photomultiplier deposited KCl as a low cut filter is more shifted to the high energy side than the rise of the first diode of the Cu-BeO photomultiplier.

When KCl is deposited on the Cu-BeO photomultiplier, there is no lowering of sensitivity accompanied to improvement of bandpass width as in the case of depositing KBr and RbCl on the SrF$_2$ window, but sensitivity is rather improved about 1 digit more than the prior type, and the bandpass width is also improved to 0.47 eV.

(2)—6 Conclusion

As a conclusion of efficiency improvement test of the photon detector, the present invention studied improvement for narrowing bandpass width of a bandpass photon detector for dominantly determining resolution of inverse photoemission spectroscopy. At the same time, the increase of sensitivity was intended. As a result of developing materials for narrowing the bandpass width, the following improvement had been obtained by such a simple method that KCl is deposited on the first diode of the Cu-BeO photomultiplier in thickness of 1000 Å.

| | |
|---|---|
| Center energy | 9.4 eV |
| Bandpass width | 0.47 eV |
| Sensitivity | improved about 1 digit as compared with the prior type |

Thereby all resolution of the inverse photoemission spectroscope have improved to about 0.5 eV. As a result, the following improvement had been obtained.

1) With improvement of all resolution to more than about 0.5 eV, the measurement with the same resolution as that of X-ray photon spectroscopy becomes possible, and the more sharper spectrum can be obtained.

2) With about 1 digit improvement of sensitivity as compared with the prior type, a current level flowed to a sample can be dropped, and a sample surface can be protected. Moreover, the number of measurement can be reduced.

Although the invention has been described with a certain degree of particularly, it is understood that the present disclosure has been made only by way of example and that numerous changes in details of construction and the combination and arrangement of parts may be resorted to without departing from the scope of the invention as hereinafter claimed.

What is claimed is:

1. A bandpass photon detector for inverse photoemission spectroscopy comprising means for condensing light emitted when a beam from an electron gun is incident into a sample by a mirror and making the condensed light incident in a low cut filter of photomultiplier having a high cut filter window, wherein potassium chloride is deposited in a thickness of 500–1000 Å on a first diode of said photomultiplier.

2. A bandpass photon detector for inverse photoemission spectroscopy comprising: a sample chamber and an analyzer chamber connected to a vacuum exhaust system, respectively, and a photon detector connected to said analyzer chamber, said sample chamber and analyzer chamber being switchably connected through a gate valve and provided with a sample transfer system for transferring a sample held at a center axial line of the sample chamber to a center portion of the analyzer chamber, said analyzer chamber being provided with an electron gun opposed to a sample positioned at a center where the sample is transferred and a photomultiplier comprising a low cut filter consisting of Cu-BeO at the opposite side of the electron gun; wherein a potassium chloride is deposited in a thickness of 500–1000 Å on a first diode of said photomultiplier.

3. A bandpass photon detector for inverse photoemission spectroscopy comprising: a photomultiplier having a high cut filter, and a low cut filter for detecting specified energy from emitted light from the sample based on a beam incident into a sample from an electron gun and emergent from the sample; a photon counter circuit having a pulse counter and a computer; a voltage control circuit of said electron gun; an electron lens voltage control circuit of said electron gun consisting of a GPIB program, whereby the control system is controlled by a computer with a GPIB programmer.

* * * * *